US012552323B1

(12) United States Patent
Martin

(10) Patent No.: US 12,552,323 B1
(45) Date of Patent: Feb. 17, 2026

(54) CARGO RACK AND COLLAPSIBLE STAND

(71) Applicant: Jonathon David Martin, Tishomingo, OK (US)

(72) Inventor: Jonathon David Martin, Tishomingo, OK (US)

(*) Notice: Subject to any disclaimer, the term of this patent is extended or adjusted under 35 U.S.C. 154(b) by 719 days.

(21) Appl. No.: 17/858,057

(22) Filed: Jul. 5, 2022

Related U.S. Application Data

(63) Continuation-in-part of application No. 16/358,283, filed on Mar. 19, 2019, now abandoned, which is a continuation-in-part of application No. 15/286,543, filed on Oct. 5, 2016, now Pat. No. 10,479,416.

(60) Provisional application No. 62/378,207, filed on Aug. 22, 2016, provisional application No. 62/237,536, filed on Oct. 5, 2015.

(51) Int. Cl.
*B60P 7/08* (2006.01)
*B60R 9/045* (2006.01)

(52) U.S. Cl.
CPC .................................. *B60R 9/045* (2013.01)

(58) Field of Classification Search
CPC .... B62D 33/02027; B60R 9/045; B60R 9/042
USPC ............. 296/3; 224/404, 405, 321; 414/462
See application file for complete search history.

(56) References Cited

U.S. PATENT DOCUMENTS

| | | | |
|---|---|---|---|
| 3,734,321 A | 5/1973 | Long | |
| 3,871,540 A | 3/1975 | Jenkins | |
| 3,972,433 A | 8/1976 | Reed | |
| 4,953,757 A | 9/1990 | Stevens | |
| 5,609,462 A | 3/1997 | Reimer | |
| 6,644,704 B1 | 11/2003 | Nyberg | |
| 8,376,684 B2 | 2/2013 | Juarez-Ortega | |
| 8,430,286 B1 | 4/2013 | Patrick | |
| 8,678,459 B1 * | 3/2014 | Win | B60P 3/40 296/3 |
| 8,684,439 B1 | 4/2014 | Calvert | |
| 10,479,416 B1 | 11/2019 | Martin | |
| 2011/0186610 A1 * | 8/2011 | Russo | B60R 9/0485 224/405 |
| 2013/0001267 A1 | 1/2013 | Infantino | |
| 2014/0197653 A1 | 7/2014 | Stepanians | |
| 2015/0353021 A1 | 12/2015 | Orme | |

* cited by examiner

*Primary Examiner* — Stephen T Gordon
(74) *Attorney, Agent, or Firm* — Harvey Law; Derrick W. Harvey

(57) ABSTRACT

The invention comprises a rack for a utility vehicle having a cab, the rack being affixed to a vehicle and comprising a rack base being affixed in a parallel relationship to a bed of the vehicle, the rack base extending between a rear portion and a front portion of the rack and having a perimeter about the rack base, the rear portion of the rack positioned towards the rear end of the vehicle and front portion of the rack positioned towards and over the cab of the vehicle; a longitudinal element bisecting the rack base, the longitudinal element extending between the rear portion of the rack and the front portion of the rack; and a first unifying element at the rack base having a-union configured at the front portion of the rack, the first unifying element positioned towards the front portion of the rack, whereby the longitudinal element bisects the first unifying element at the union, whereas the first unifying element is disposed within the perimeter of the rack base.

20 Claims, 13 Drawing Sheets

CARGO RACK AND COLLAPSIBLE STAND

RELATED APPLICATION

This application is a Continuation-In-Part to U.S. application Ser. No. 16/358,283 filed on Mar. 19, 2019, entitled "Cargo Rack and Collapsible Stand" which claims priority to Continuation-In-Part to U.S. application Ser. No. 15/286,543 filed on Oct. 5, 2016, entitled "Overhead Cargo Rack and Stand" which claims priority to U.S. Provisional Application No. 62/237,536 filed on Oct. 5, 2015, entitled "Overhead Cargo Rack" and U.S. Provisional Application No. 62/378,207 dated Aug. 22, 2016 entitled "Overhead Cargo Rack."

BACKGROUND OF THE INVENTION

The invention comprises an overhead storage rack for vehicles. The invention may further comprise a rack with a first surface and a second surface that have different altitudes. The invention may even further comprise an overhead rack for utility vehicles with a cab and a bed. The invention may even further comprise an overhead rack that includes a hoist system. The invention may even further comprise a collapsible stand for mounting atop the rack.

1. Field of the Invention

The present invention relates to storage racks for vehicles. The invention further relates to the transportation of goods in smaller vehicles, such as ATVs and UTVs. The invention even further relates to a rack for storing bulk goods advantageous for use in environments where smaller vehicles are necessary to navigate the terrain. The invention even further relates to a rack having a stand to allow users to surmount the stand for the purposes of observation, hunting or other uses.

2. Description of Related Art

In recent times, the use of all-terrain vehicles (ATVs) and utility terrain vehicles (UTVs) have increased greatly for use in ranching, utility and pipeline maintenance, hunting, camping, and other applications. These vehicles are sometimes equipped with cargo boxes, saddle bags, bumper baskets and/or racks that extend horizontally from the seat horizon of the vehicle.

However, tasks that require the transportation of goods will inevitably fall short with such limited storage space. Some accessories for smaller vehicles in the art exist within the bed of the vehicle. Trailers may be attached to the vehicles but limit the navigation and extend the length of the vehicular footprint. With the side by side vehicles and UTVs with cab and bed profiles, storage is limited in the manufacturer models, and after-market solutions have failed to provide substantial storage that leave the bed of the vehicle free and clear for its intended uses.

There exists a need for a better system of transportation goods for use with smaller vehicles. There further exists a need for an accessory to ATVs and UTVs that may be easily installed at the dealership or as a consumer aftermarket solution. There also exists a need for a system for carrying large goods without disrupting the balance of such smaller vehicles.

SUMMARY OF THE INVENTION

These and other objects were met with the present invention. The present invention comprises a rack for a utility vehicle having a cab, the rack being affixed to a vehicle and comprising a rack base being affixed in a parallel relationship to a bed of the vehicle, the rack base extending between a rear portion and a front portion of the rack and having a perimeter about the rack base, the rear portion of the rack positioned towards the rear end of the vehicle and front portion of the rack positioned towards and over the cab of the vehicle; a longitudinal element bisecting the rack base, the longitudinal element extending between the rear portion of the rack and the front portion of the rack; and a first unifying element at the rack base having a union configured at the front portion of the rack, the first unifying element positioned towards the front portion of the rack, whereby the longitudinal element bisects the first unifying element at the union, whereas the first unifying element is disposed within the perimeter of the rack base; the first unifying element further comprising a first leg and a second leg configured about the rack base, the first leg and second leg each having a first unifying end, the first unifying ends of the first leg and second leg converging at the union; the first unifying element further comprising a third leg configured about the rack base, the third leg connecting the first and second legs at an end opposite of each of the first unifying ends of the first and second legs, whereby the longitudinal element bisects the third leg of the unifying element; the rack further comprising an upper portion positioned above the rack base, the upper portion having a first supporting member; the first supporting member of the upper portion positioned extending above the union of the rack base; the rack base further comprising a second unifying element having a second union positioned at the rear portion of the rack, the second unifying element positioned towards the rear portion of the rack, whereby the longitudinal element bisects the second unifying element at the second union; the second unifying element further comprising a first leg of the second unifying element and a second leg of the second unifying element, the a first leg of the second unifying element and a second leg of the second unifying element configured about the rack base, the first leg of the second unifying element and a second leg of the second unifying element each having a rear unifying end, the rear unifying ends of the a first leg of the second unifying element and a second leg of the second unifying element converging at the second union; the second unifying element further comprising a third leg of the second unifying element configured about the rack base, the third leg connecting the first leg of the second unifying element and a second leg of the second unifying element at ends of the first leg of the second unifying element and a second leg of the second unifying element opposite of the unifying end of the first and second legs of the second unifying element, whereby the longitudinal element bisects the third leg of the second unifying element; whereby the third leg of the first unifying element and the third leg of the second unifying element are congruent; the rack further comprising an upper portion positioned above the rack base, the upper portion having a second supporting member; the rack being connected to the vehicle in at least one of the following areas of the vehicle: a bed, a roll-bar, a chassis, a cab; the rack further comprising at least one vertical support extending between the rack base and a bed of the vehicle, the at least one vertical member having mating portions being telescopically adjustable in height, whereby a user of the rack may affix the height of the at least one vertical member along mating portions of the at least one vertical member; the rack further comprising a bottom surface proximal to the vehicle bed, the bottom surface having a first side and a second side, the first side and second side being capable of extending and retracting in a direction parallel with the longitudinal element, the first and second side further comprising a telescopic extension being secured by at least affixing element; the perimeter at the rear portion of the rack having a gate about the upper portion of the rack; whereby the unifying element resembles an arrow pointing towards the front of the vehicle; the rack further comprising an upper portion positioned to communicate with the perimeter of the rack base, and further comprising a support member extending between the rack base and the upper portion; the rack further comprising a slide member disposed between the vertical support member and the sides of the rack base, whereby the sliding member may travel along the rack base while the bottom surface extends or retracts at a mating portion of the bottom surface; the sliding member configured to mate to the rack at a selected position of the mating portion of the bottom surface; the rack further comprising at least one vertical support extending between the rack base and the bottom surface, the at least one vertical member being telescopically adjustable in height, whereby a user of the rack may raise or lower it by engaging the mating portions along the at least one vertical member; the rack further comprising a gate at a rear portion of the upper portion of the rack, the gate configured to be removed or extended in a direction along the sides of the upper portion of the rack.

BRIEF DESCRIPTION OF THE DRAWINGS

The invention will now be described in greater detail with reference to the drawings.

DETAILED DESCRIPTION OF THE INVENTION

The present invention provides multiple advantages over the prior art solutions. The invention provides a kit and system for overhead storage rack to be affixed on vehicles. The invention further provides a solution to limited storage on vehicles capable of traveling into challenging terrain. The invention even further provides a rack system for use with cab or canopy above the passengers and a bed behind the passenger area. The invention even further provides a solution for at least a two-tier storage profile, where light items may be stored overhead and heavier ones at the bed level. The invention provides a solution for hunters who wish to use the vehicle with a stand for portable hunting with the ability to transport greater cargo than on foot.

Figure 1:
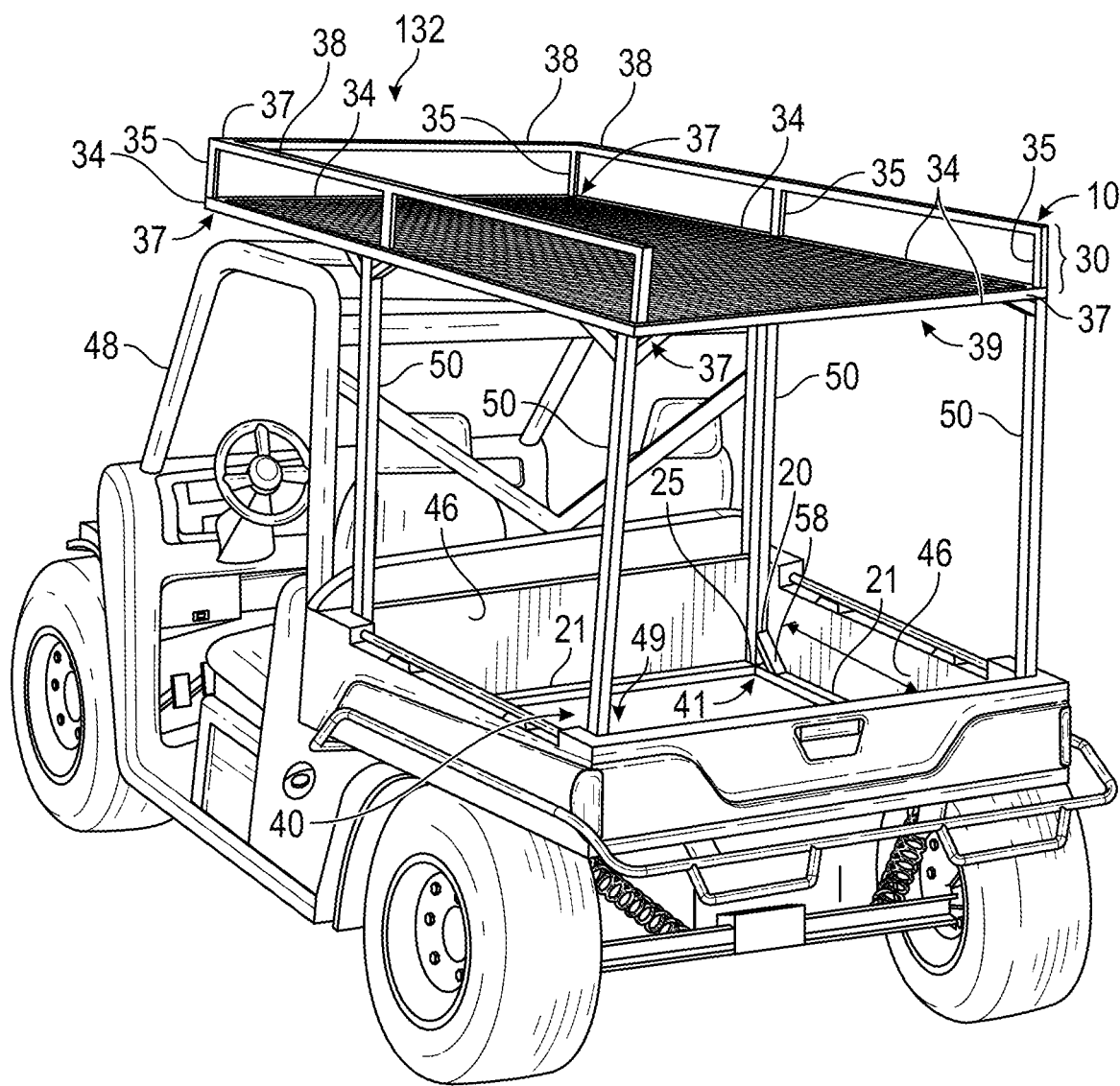
FIG. 1 depicts a rear perspective view of an embodiment of the rack system.
Figure 2:
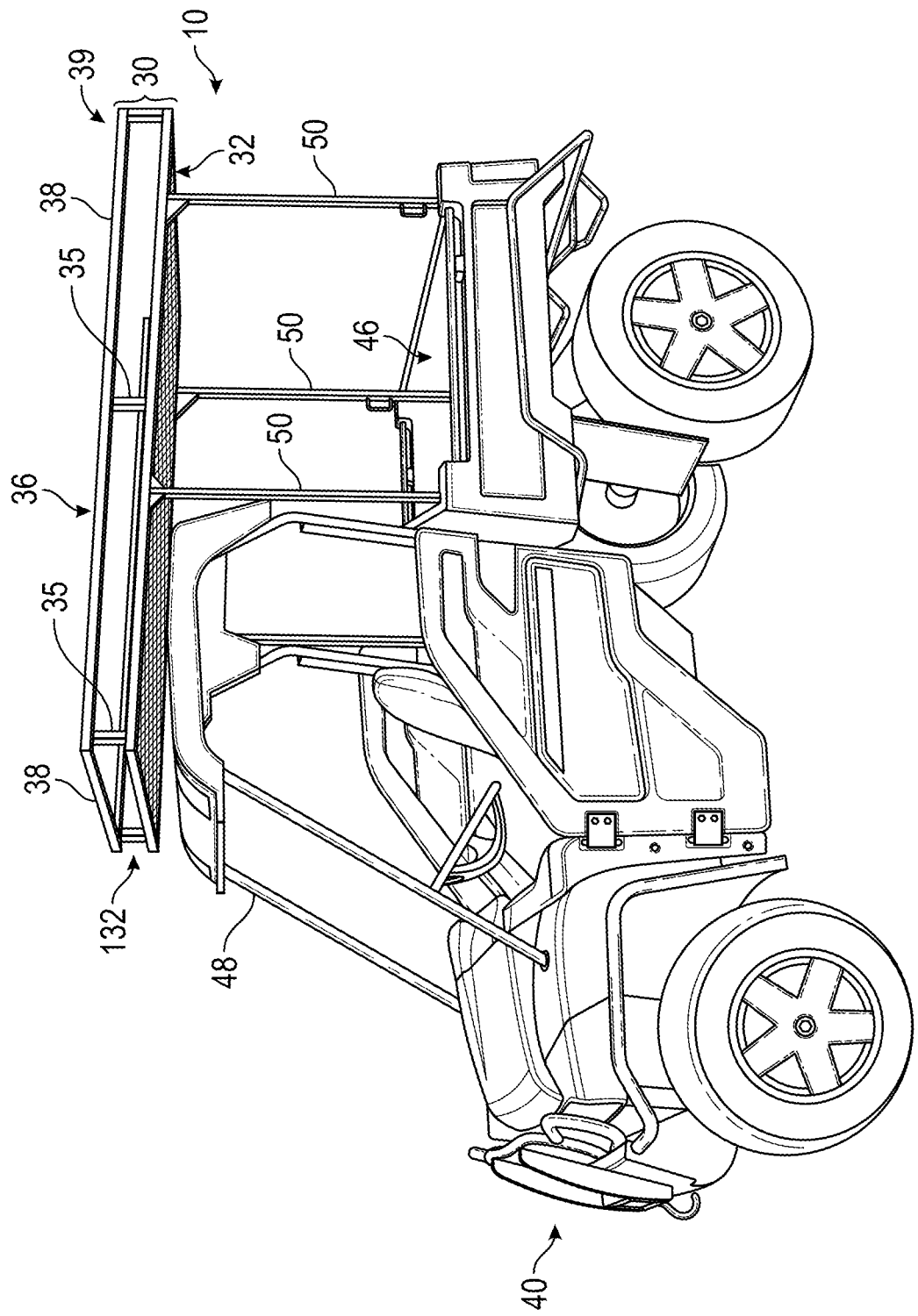
FIG. 2 depicts a side perspective view of an embodiment of the rack system
Figure 3:
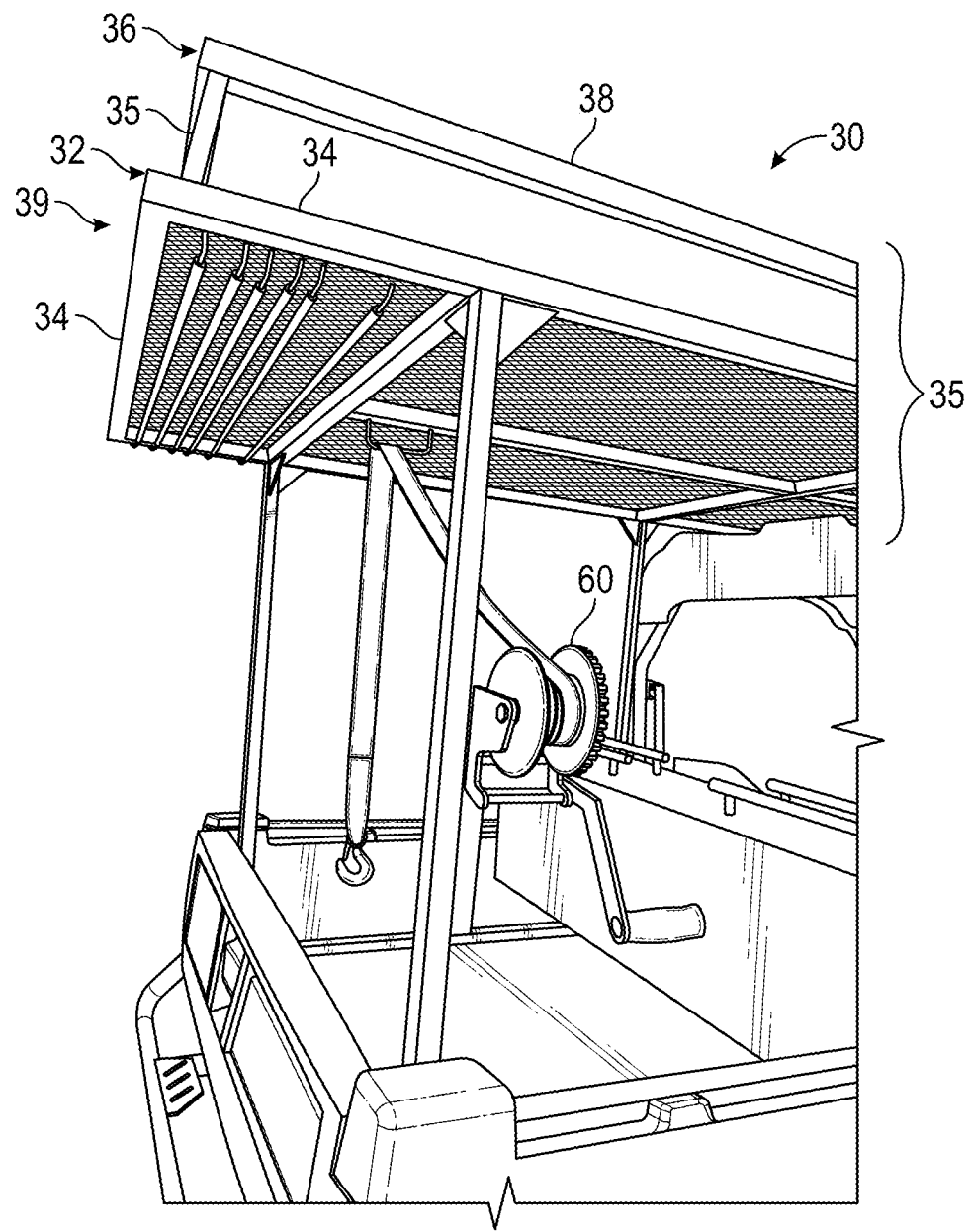
FIG. 3 depicts an isolated side view of a rear portion of an embodiment of the rack system.
Figure 8:
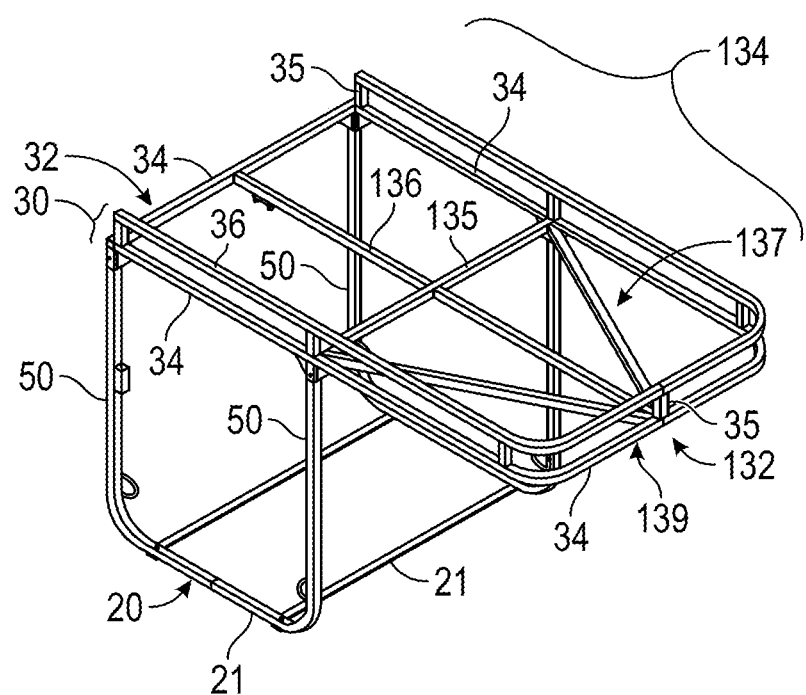
FIG. 8 depicts a top perspective views of an embodiment of the rack system
Figure 9:
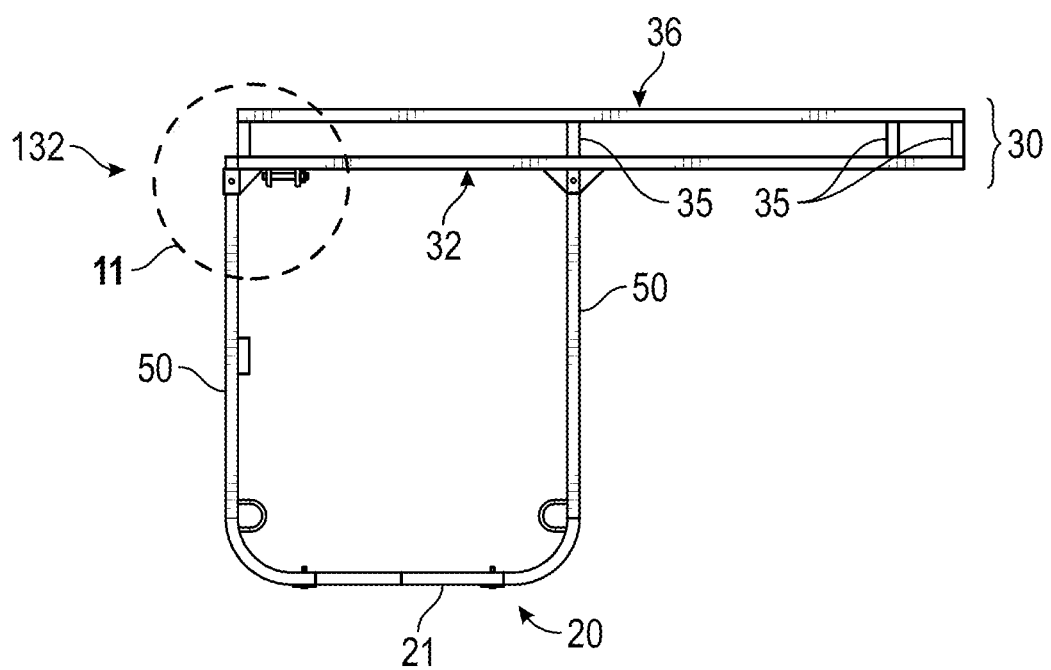
FIG. 9 depicts a side view of an embodiment of the rack system.

According to embodiments shown in FIGS. 1-3, the rack 10 may comprise a bottom or first surface 20 and a top or second surface 30. The second surface 30 may extend over the cab and bed of a vehicle such as an UTV or side by side ATV, or any other vehicle that may have a cargo box type bed 49. The bottom or first surface 20 may be positioned atop or mated with floor 40 of the box type bed 49. As seen in FIGS. 1, 8 and 9, the bottom or first surface 20 resembles a frame having four sides 21 and intersections 25 that may be angular as in FIG. 1, or arcuate as seen in FIG. 8, depending upon the profile of the box type bed to which the rack 10 is intended to mate. As depicted, the bottom surface 20 does not have a continuous surface, but rather a frame that securably seats onto the corners 41 of the box type bed. In other embodiments not shown, the bottom surface 20 may resemble other structural configurations, such as additional framework, grating, protective surfacing (such as bed lines or rubber mats). In addition, the framework as shown in the bottom surface 20 have alternative frames connections, so frame connections are positioned distal of the perimeter walls 46 of the vehicle bed, such as in a tic-tac-toe grid. From the bottom or first surface 20, the rack 10 may connect to the second surface 30 as shown in FIGS. 1-4 and 8-9 by way of four vertical supports 50 disposed between the bottom surface 20 and the top or second surface 30. As seen in FIG. 1, the bracing elements 58 may connect the vertical supports 50 and the bottom surface 20. In embodiments shown in FIGS. 8 and 9, the bottom surface 20 may connect to the vertical supports 50 with an integral construction of a curved profile. The curved profile may be manufactured as one-piece, and/or may have interconnecting pieces, such as journaling internal anchors within the frame. Still other embodiments of the invention envision connections not shown that are within the scope of this invention, especially those commonly known in the arts.

The second or top surface 30 may connect to the vertical supports 50 in a similar manner as the bottom or first surface 20. In the embodiments shown in FIG. 8, the second surface 30 illustrates a more perpendicular connection between the second surface 30 and the vertical supports 50. Second surface 30 may comprise a base 32 and an upper portion 36. The base portion 32 may comprise four sides as shown in FIGS. 8 and 9 or have other n-sided configurations, not shown. The upper portion 36 may have three sides 38, as shown in FIG. 8 as a bar that is positioned above the exterior perimeter of the base portion 32, leaving open the side 139 correlating to the back of the vehicle, or opposite the side of the cab 48 of the vehicle. In other embodiments, the back side of the upper portion may comprise a fourth side. In another embodiment of the invention not shown, the fourth side may comprise a back side surface that may hinge generally at the base 32 of the second surface 30 and pivot up to securely latch in an upright position.

Figure 4:
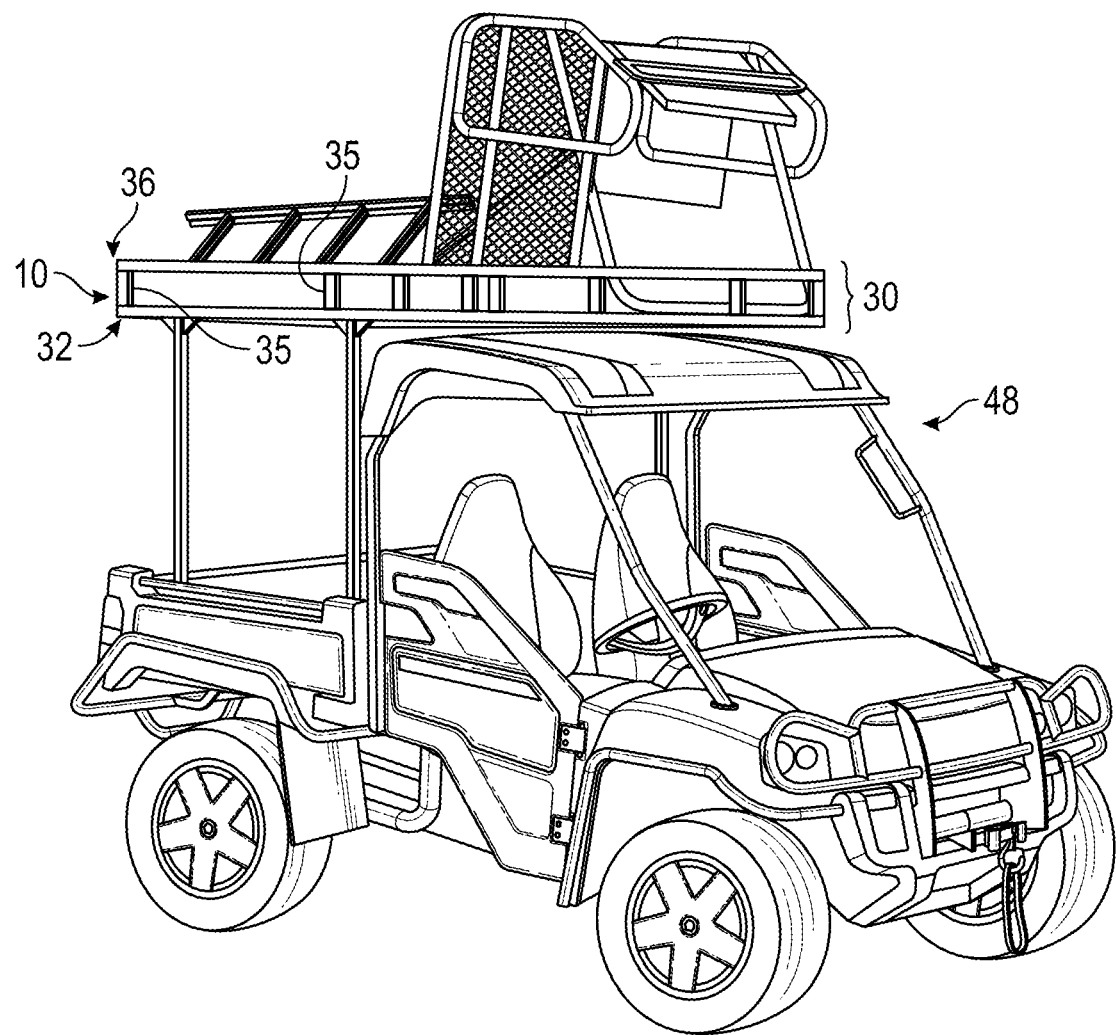
FIG. 4 depicts a side perspective view of a rear portion of an embodiment of the rack system having a stand.

At the corners of the base 32 and upper portion 36 may be rounded or angular intersections 37. In other embodiments of the invention, the corners of the base portion 32 and upper portion 36 may have other curved or linear structural profiles that connect the sides 34 of the base portion 32 and the sides 38 of the upper portions 36. Between the base portion 32 and upper portions 36 may be various connecting elements 35 that hold the upper portion 36 at a distance from the base 32 portion. The base portion 32 is shown in FIGS. 1 and 4 as a horizontal surface that extends over the cab 48 and bed 49 of the vehicle 40. In other embodiments of the invention, base portion may include planes that are not parallel to the horizon of the ground beneath the vehicle. In still other embodiments, base portion may comprise more than one surface plane.

Figure 12:
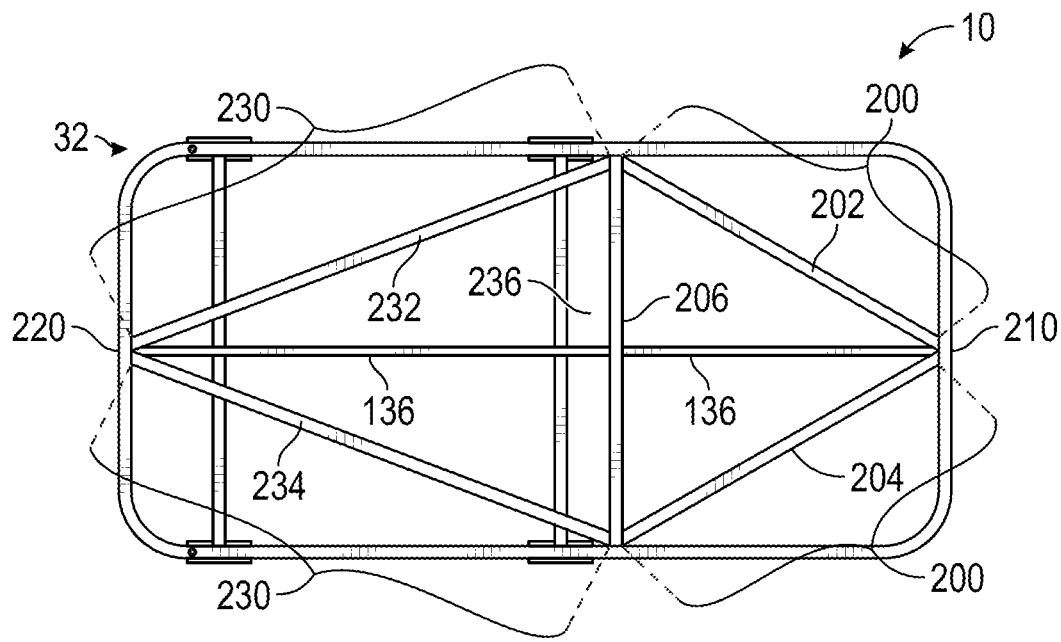
FIG. 12 depicts a top view of an embodiment of the invention.
Figure 13:
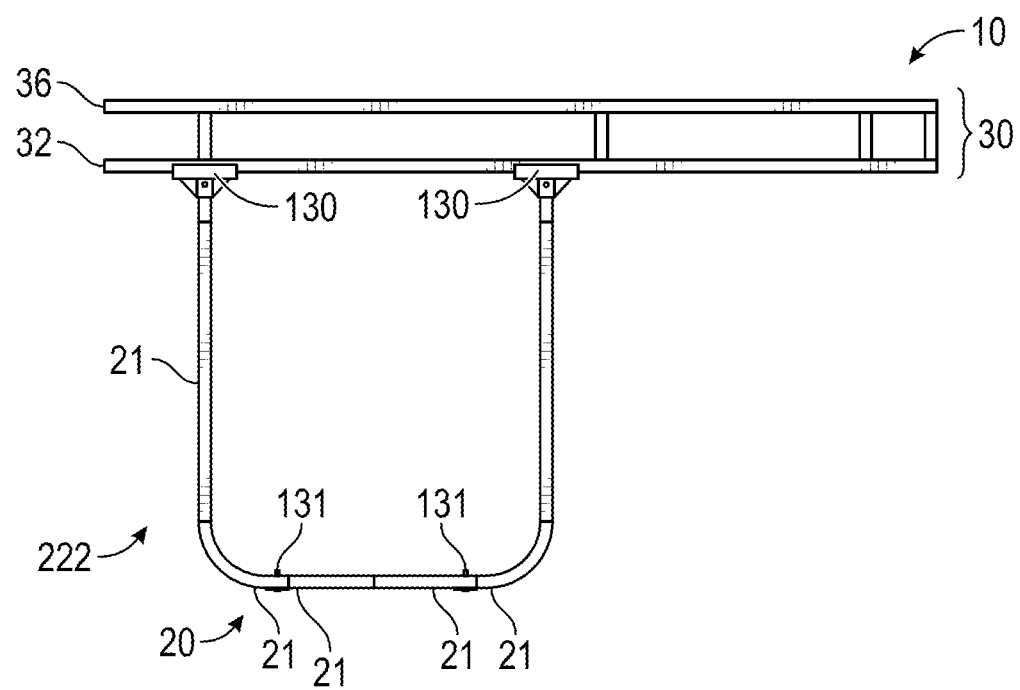
FIG. 13 depicts a side view of an embodiment of the invention.
Figure 14:
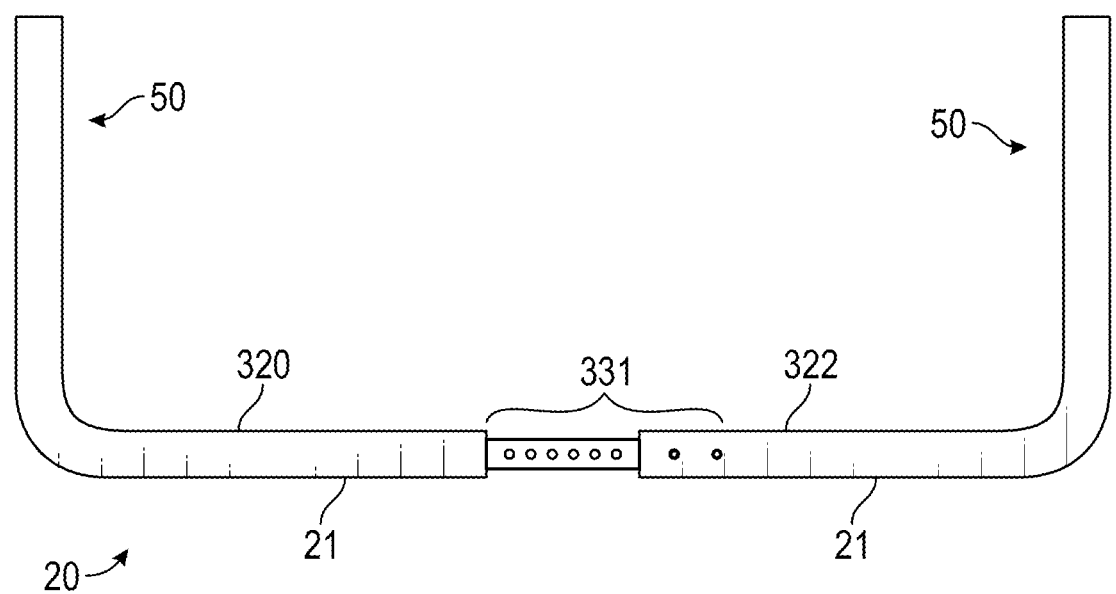
FIG. 14 depicts a side view of the bottom portion, illustrating mating portions of sides of the bottom surface, according to embodiments of the invention.

In another embodiment of the invention shown in FIGS. 12-13 and in an independent view in FIG. 14, bottom surface 20 may include a connecting element 23 that may be adjustably extendable in directions co-linear with a longitudinal element 136, so that a user may pull out telescopic or other extension styled portions of the sides 21 of the bottom surface 20 so that atop vertical members 50, a slide member 130 may facilitate the longitudinal movement of the bottom surface 20 vis a vis the base portion 32. As seen in FIG. 13, Sides 21 of the bottom surface 10 may be equipped with vertical members pins 131 to set the distance of the adjustment along the sides 21 of the rack base 20. In FIG. 14, pins 133 may be disposed to one of the sides of the bottom surface 20, rather than the top, and thus oriented perpendicular to the front or back of the vehicle. In this embodiment, pins 133 may be secured by key or other locking mechanism, so when unlocked the pins 133 may be unlocked from securing a first element 320 of bottom surface 20 to the second element 322 of the bottom surface 20. Pins 131 and 133 may mate with mating portions 331 of the bottom surface. As shown in FIG. 14, mating portions 331 may be positioned on first element 320 of the bottom surface. In other embodiments not shown, mating portions 331 may be disposed upon the second element 322 of the bottom surface 20, as an independent piece of either first 320 or second 322 elements of the bottom surface, or in other indirect relationships between the first 320 and 322 elements of the bottom surface that enable telescopic adjustments, including exterior piece sheathing over the first 320 and second 322 elements of the bottom surface. In another embodiment of the invention not shown, bottom surface may be equipped with an adjustable length through other mechanical connections, including but not limited to bolt/nut, pressure set screws, spring screws, and other affixing elements known in the arts to connect tubing, pipe, rods or other structural pieces. As sides 21 extend toward the rear 222 of the vehicle or the front of the vehicle, slide member 130 thusly travels along the sides 34 of the base portion 32 so that the base portion 32 and upper portion 34 may remain in place. In other embodiments not shown, slide member 130 may be capable of further securing of the base portion 32 while the bottom surface 20 has been adjusted to the preferred configuration. Here, base portion 32 may be held through a friction fit element against the slide member 130 or the vertical support(s) 50. Slide member 130 may take on a variety of geometrical configurations capable of allowing passage of the base portion 32 in a front to back direction (and back to front) within the scope of the invention, including hinging locks by way of example. These various slide member embodiments may facilitate the extension of the bottom surface to better fit vehicles with multiple rows of seating that otherwise intrude into the bed of the vehicle and thus the frame of the rack.

Figure 15:
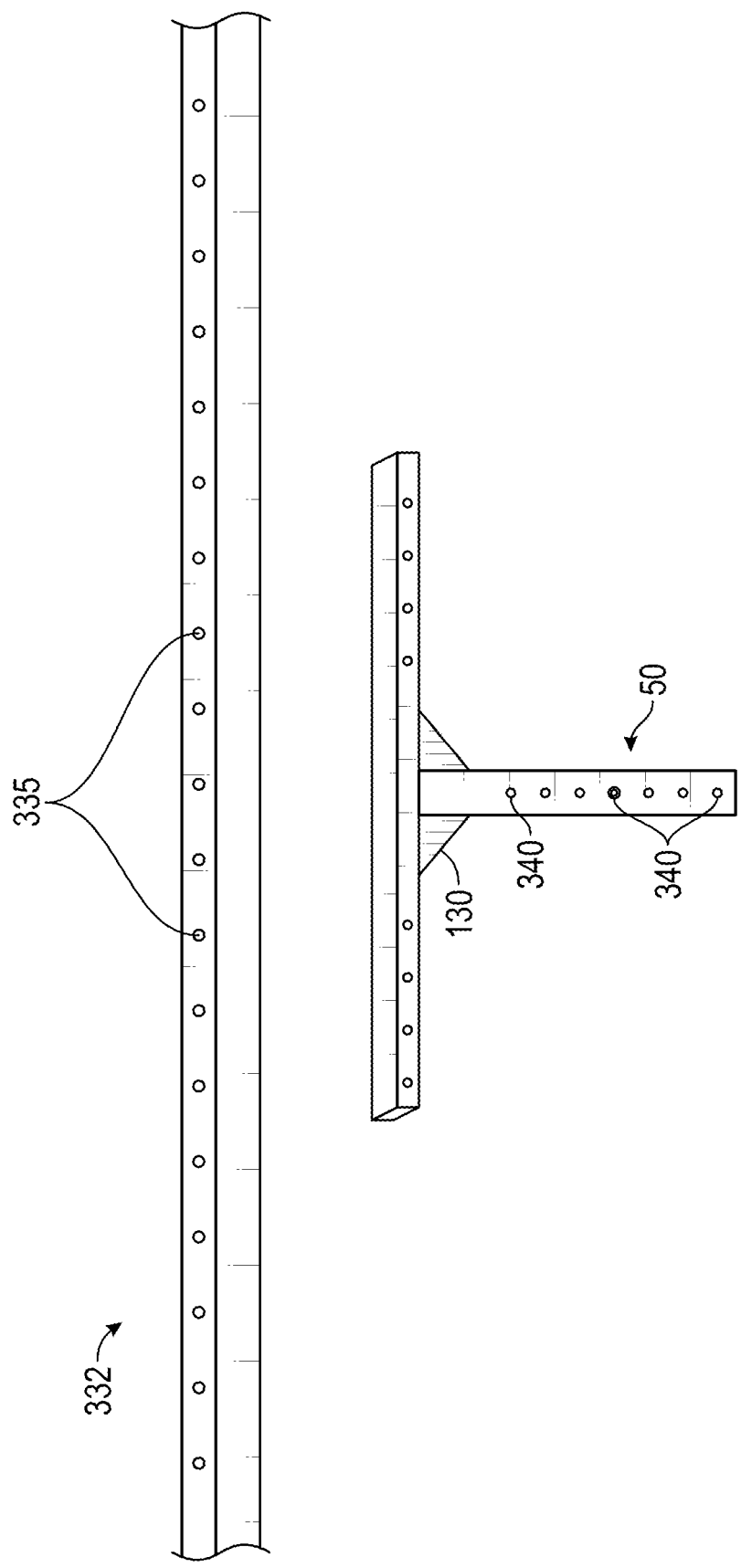
FIG. 15 depicts a base portion and its mating portions in an exploded view from a sliding member and its mating portions according to embodiments of the invention.

In other embodiments shown in FIGS. 13 and 15, the vertical supports 50 may be adjustably extendable between the bottom surface 20 and second 30 surfaces of the rack 10 using pins 131 to lock in a desired height anywhere along the vertical supports 50 in a similar way as shown for base sides 21, described above. In this embodiment, a user may adjust the height of the vertical supports 50, and thus, the overall height of the rack 10. In FIGS. 12 and 13, the sliding members 130 may facilitate the raising or lowering of the base portion 32 and upper portion 36, or second surface 30.

Looking further at FIG. 15, a relationship between an extendable base portion 332 and a sliding member 130 with an adjustable vertical support 50. extendable base portion 332 is shown with mating portions 335, which may mate with the mating portions 350 positioned along a side face of sliding member 130. Mating portion 350 of the sliding member may thus mate with mating portions 335 of the extendable base portion, lining up those respective mating portions and affixing them to a set position using pins, locks, bolts, keys or other affixing elements known in the arts. In FIG. 15, a user may move the sliding member 130 along the extendable base portion 332 using an embodiment such as shown in FIG. 14, where the bottom surface sides 21 may be adjustable and thus moving the sliding member along the extendable base portion 332. The mating relationship between sliding member 130 and the extendable base portion 332 may be configured in other embodiments of the invention. Rather than lining up the mating portions 350 of the sliding member 150 and the mating portions 335 of extendable base portion 332, it is well within this invention to affix sliding member 150 to the extendable base portion 332 by other mechanical mating structures. By way of example and not limitation, extendable base portion may be held through a friction fit element against the sliding member 130 or the vertical support(s) 50. Sliding member 130 may take on a variety of geometrical configurations capable of allowing passage of the base portion 332 in a front to back direction (and back to front) within the scope of the invention, including hinging locks by way of example. As depicted in FIGS. 13 and 15, sliding member 130 may have a cradle with angular elements to support the base portion or rack base. Other embodiments of the sliding member may have curved portions, linear portions, or combinations thereof. Sliding member may have slider supports 354 extending between the cradle 355 and other portions of the sliding member, or even down to the vertical support. Sliding supports may include curved and linear portions or combinations thereof within the scope of the invention.

Figure 10:
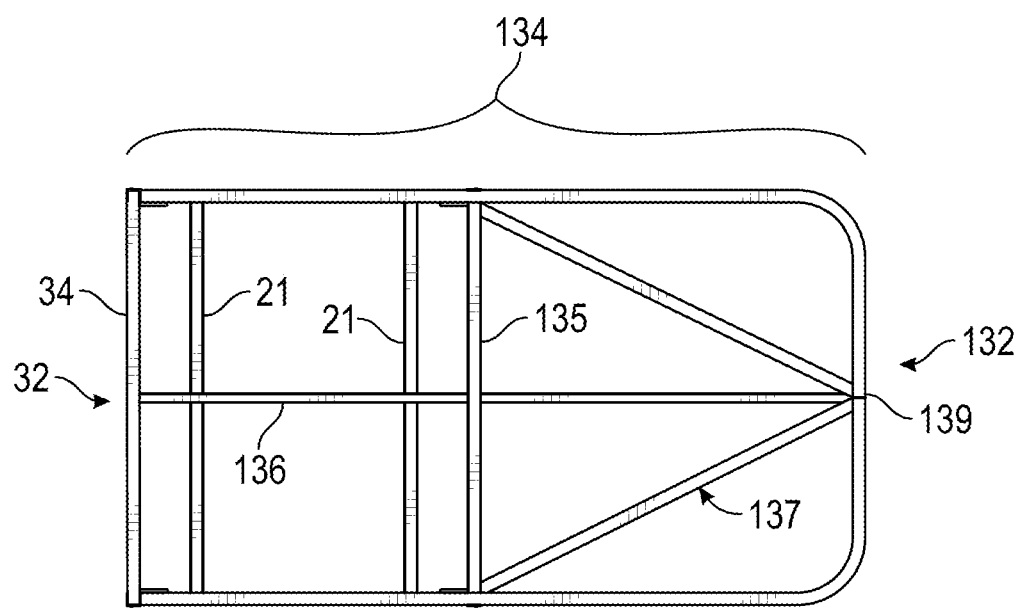
FIG. 10 depicts a top view of the structure of the overhead rack system.
Figure 11:
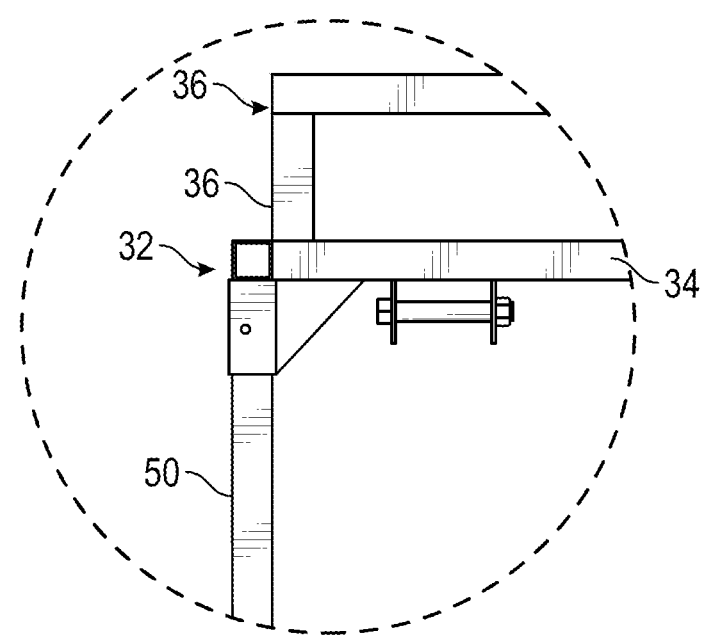
FIG. 11 depicts a side view of the overhead rack system as the top surface connects to the base surface.

In another embodiment of the invention shown in FIGS. 8 and 10, the base 32 is shown as having a configured element 134 at the portion of the base positioned atop the cab 48 of the vehicle 40. The configured element 134 is shown as resembling an arrow that "points" towards the front of the vehicle 40, though other styles of configured elements may be within the scope of the invention. The configured element 134 may comprise a longitudinal element 136 extending between the front of the base 32 (correlating to the front of the vehicle) and the back of the base 32 (correlating to the back of the vehicle 40). The longitudinal element 136 may bisect a triangular element 137, as shown in FIG. 8, where the apex 139 of the triangular element 137 may meet with the front of the longitudinal element 136 at the front 132 of the base 32. Opposite the apex 139 of the triangular element 137, a side 135 of the triangular element 137 may extend between sides 34 of the base portion, shown in FIG. 8 to be sides 34 of the base portion that are parallel to the longitudinal element 137. In FIG. 8, side 135 of the triangular element is bisected by the longitudinal element 136. In the embodiment shown, configured element 134 connects to the base 32 approximately at the union where a connecting element 35 is also positioned at the front. The triangular aspect 137 of the configured element may be disposed roughly above the cab 48 of the vehicle 40 as shown in the FIG. 8.

In other embodiments not shown, the configured element may comprise other geometric configurations that connect and support the rack, either from the base portion, from upper portion or from other structures not shown in the illustrations.

Other embodiments of the rack can also be built to accommodate light bars or spotlight accessories. It may also be outfitted with a winch and pulley system to lift heavier items into the cargo box of the vehicle.

In an embodiment illustrated in FIGS. 12-13, the rack base 32 may include a first unifying element 134 on the front portion 212 that correlates to the front portion of the vehicle, and a second unifying element disposed towards the rear portion of the vehicle. The first unifying element may comprise a first union positioned at the front portion of the rack base, and a second union positioned at the rear portion of the rack base. First Unifying element 200 may have first 202, second 204 and/or third 206 legs, with at least a first 202 and second 204 legs converging at the first union 210 of the rack base 32, and in FIG. 12 further comprising the third leg 206. The opposite ends of the first 202 and second 204 legs may extend towards ends of the third leg 206, so that in alternative embodiments of the invention the first 202, second 204 and third 206 legs of the first unifying element 200 comprise a triangular shape. In another embodiment of the invention, the first unifying element 200 along with the longitudinal element 136 may resemble an arrow pointing towards the front 132 of the vehicle 40. The rack base 32 may comprise a second unifying element 230 having also having a first 232, second 234 and third 236 leg. Second unifying element 230 may similarly comprising a second union 220 positioned at the rear portion of the rack base 32, so that the first leg 232 and second 234 legs of the second unifying element 220 converge at the second union 220. The opposite ends of the first 232 and second 234 legs may extend towards ends of the third leg 236, so that in alternative embodiments of the invention the first, second and third legs of the second unifying element comprise a triangular shape. In an embodiment of the invention, the third leg 236 of the first unifying element 206 may be congruent with the third leg 236 of the second unifying element 220, or they may be the same structure altogether as shown in FIG. 12.

Figure 16:
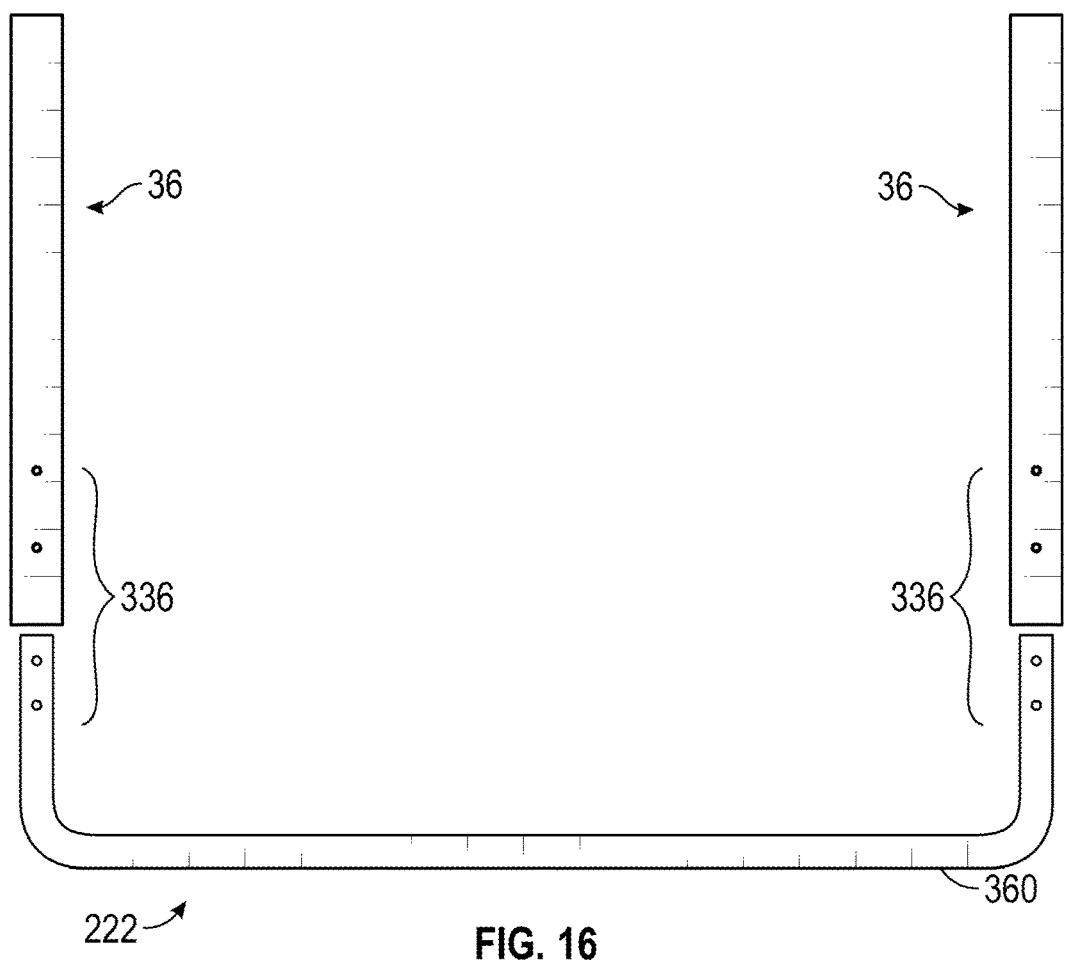
FIG. 16 depicts the upper portion of the rack having a gate at the rear portion of the rack according to embodiments of the invention.
Figure 17:
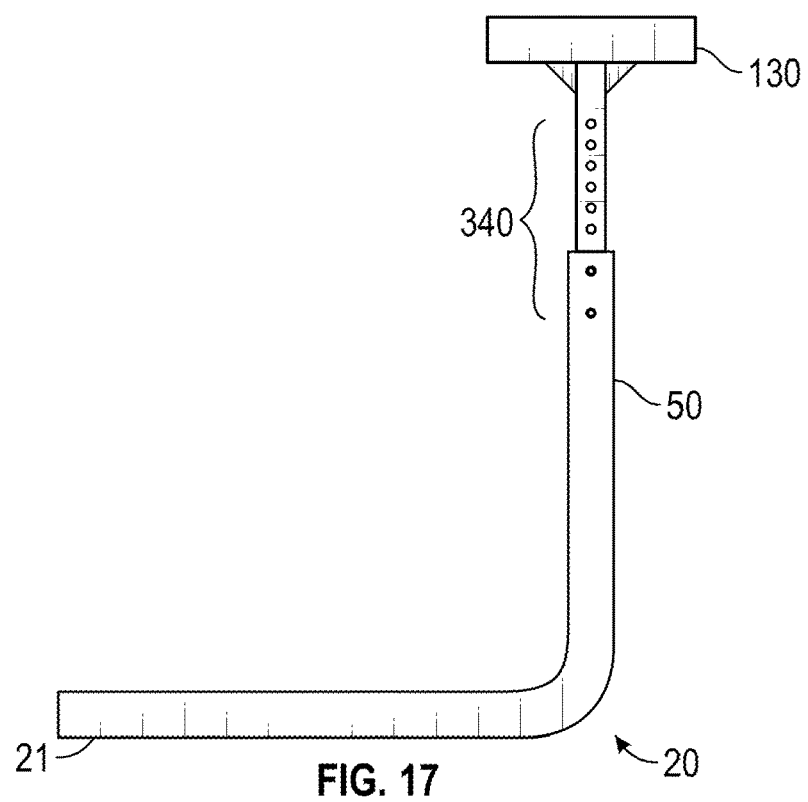
FIG. 17 depicts a side view of a side of the bottom surface, an adjustable vertical support having mating portions with a sliding member.

In an embodiment shown in FIG. 16, at the rear portion 222 of the vehicle the upper portion 36 may include a gate 360. In FIG. 16, gate 360 is shown to be adjustable and removeable from the upper portion 36, having mating portions that mate with the upper portion 36 by way of paired pins as described in this application and mating portions 336. In other embodiments of the invention not shown, upper portion may be equipped with an adjustable length through other mechanical connections, including but not limited to bolt/nut, pressure set screws, spring screws, and other affixing elements known in the arts to connect tubing, pipe, rods or other structural pieces.

The inventive rack may be manufactured from various sizes of steel or aluminum depending upon the cargo weight capacity of the vehicle and user's application. In one embodiment, the inventive rack may be attached to the vehicle by the use of a turnbuckle system or nylon ratchet straps that attach to existing cargo hooks in the bed of the vehicle. This embodiment requires a minimal amount of tools for installation on current, popular models of smaller UTV and ATV vehicles. Other embodiments may include different solutions for attaching the rack to the vehicle, including pre-manufacturing seating chambers or channels in the bed of the vehicles, or affixing such a seat atop the bed of the vehicles, into which the first surface may mate. Still other solutions of affixing the rack to a vehicle exist within the scope of this invention. For vehicles that do not have cargo hooks in the bed, the rack may be installed by drilling holes through the bed and attaching with bolts. This embodiment of the rack may also be customized with additional cross members, expanded metal mesh, ladder or hooks attached to the vertical supports to secure cargo that is placed in the cargo box or secured to the outside of the frame. In still other embodiments, the rack may attach to the rollbar of the vehicle by way of angular supports from the base portion 32. The rack may attach to other portions of the vehicle, such as areas of the cab, to the chassis of the vehicle, to the sides upward of the bed, or to other areas of the vehicle capable of supporting the rack. The rack may attach to the above-described areas of the vehicle independently, or in coordination with attachments to the bed of the vehicle.

The top or second surface may include a variety of surface profiles, such as an expanded metal mesh to prevent smaller items from falling though the bottom of the frame. The floor of the frame may be constructed with square tubing cross member of various metal, composite or other material construction. As shown in FIG. 4, hunters may use the overhead rack to carry items such as collapsible duck/goose blinds, decoys, large ladder type deer stands, deer feeders, frames for feeders and other types of deer stands overhead and still leave the cargo box open for carrying tools, feed and supplies. Looking at FIG. 3, With a winch system 60 attached large animals such as deer or hogs can be loaded into the cargo box of the vehicle. Campers may use this overhead rack to carry large bulky items such as sleeping bags and tents, leaving the cargo box available for ice chests and supplies. Farmers and ranchers can use this to carry larger items such as fence posts, post hole diggers, calf pullers and large hand tools overhead and leave the cargo box open for smaller heavier items such as tools, hay or feed. Industrial type uses for surveyors, seismograph crews, construction companies or others, this rack allows the extra overhead capacity for hauling survey stakes, cables, larger hand tools, light weight pipe or boards.

Figure 5:
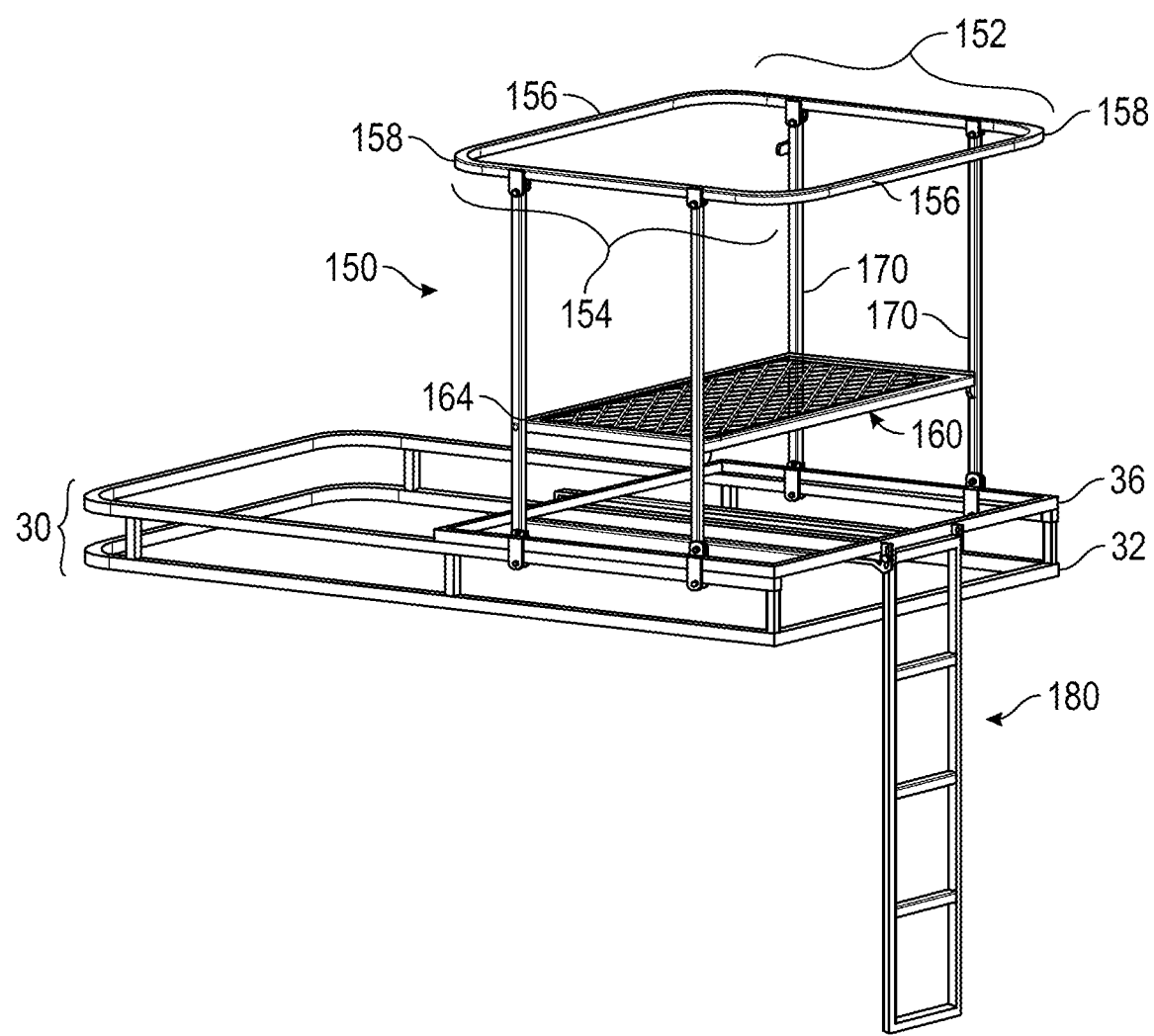
FIG. 5 depicts a side view of a rear portion of an embodiment of the rack system isolated with the stand in operation.
Figure 6:
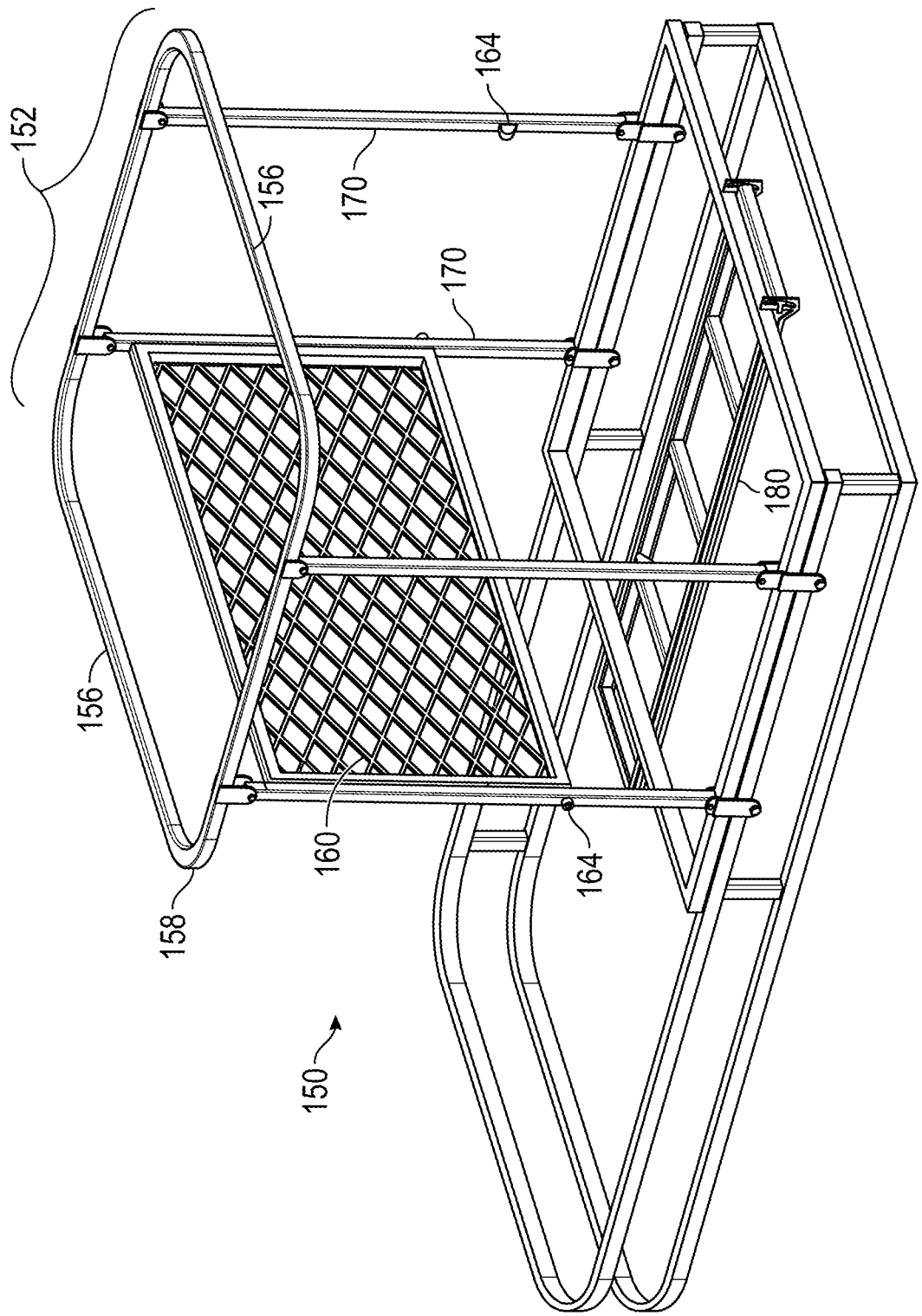
FIG. 6 depicts view of a side view of an embodiment of the rack system with the stand partially collapsed.
Figure 7:
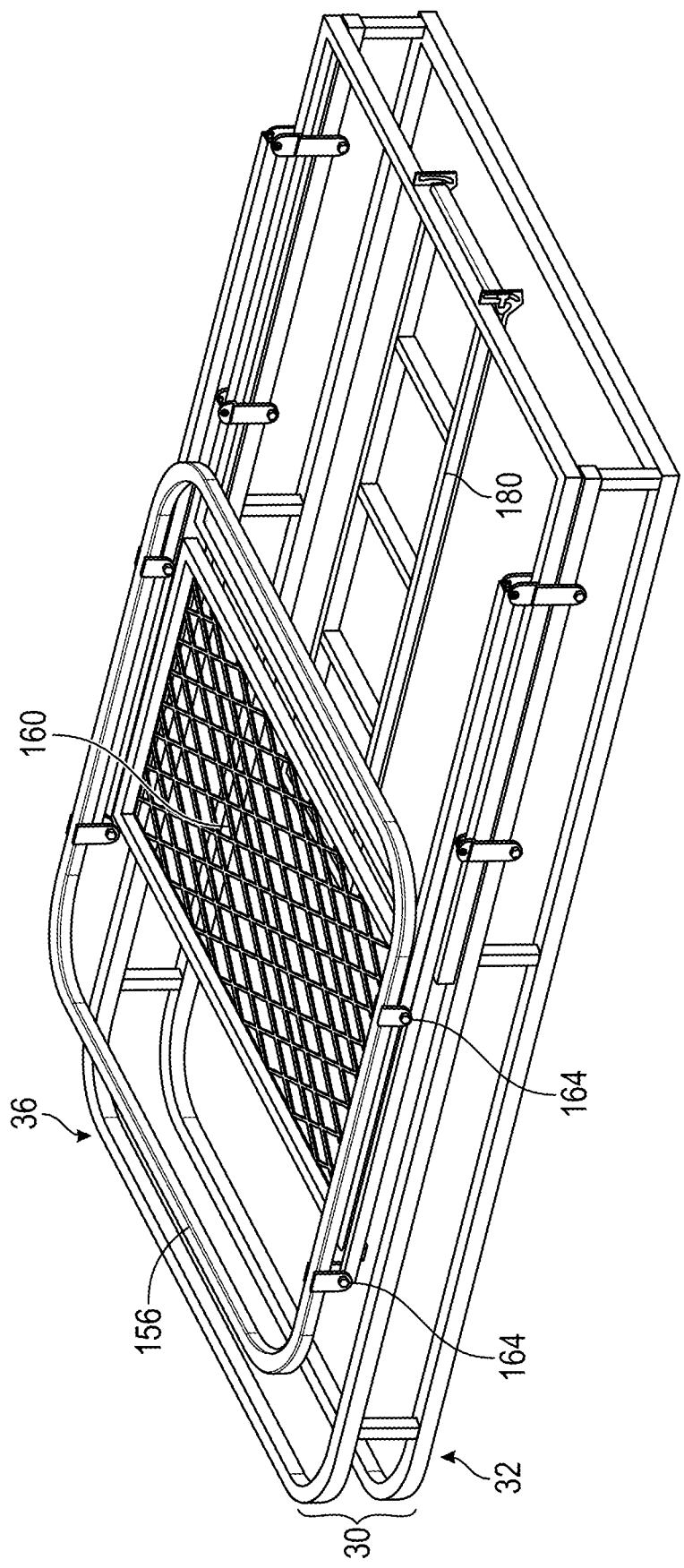
FIG. 7 depicts a side view of an embodiment of the rack system with the stand fully collapsed

In another embodiment shown in FIGS. 5-7, a stand 150 may be mounted upon the rack 10. According to the embodiments illustrated, the rack 10 may comprise a base 32 and an upper portion 36, the upper portion 36 capable of supporting the deer stand 150 with bolts and clamps as seen in the illustrations. The stand 150 may have a mounting portion and four legs 170 that extend between the upper portion 36 of the rack and the base 32, as shown in FIGS. 5-7, or may have other numbers of legs or other supporting members that may mount to the upper portion and/or the base. The stand 150 may be disposed upon other described embodiments of the rack not depicted in FIGS. 5-7.

Continuing with the embodiment in FIGS. 5-7, the stand may further comprise a crown portion 152 that may be supported by the legs 170 of the stand 150, so that the crown portion 152 may create a perimeter 154 about the stand. The crown portion 152 may have four sides 156 with curved corners 158, as seen in FIGS. 5-7, or having angular corners, or may have other geometric configurations such as an n-sided polygon, a circular or wholly arcuate (but irregular) shape. Furthermore, it is within the scope of this invention for the stand to have facing between the crown portion 152 and the stand 150 or even the mounting portion, the facing capable of folding down during storage. Users may utilize the crown portion for safety against falling off the stand, for firearm support, and other advantageous functionality.

As seen in FIGS. 5-7, a stage may be stored in a parallel disposition between two of the legs 170, so that an upper portion 162 of the stage 160 may be detached and lowered into a perpendicular relationship with the legs 170. In the embodiment shown, the stage 160 may be secured by pins 164 (such as hitch pins or other fasteners) to the legs. In other embodiments, the stage 160 may be secured to the upper rail of the rack, the base of the deer stand, or other features within the scope of the invention. A ladder 180 may be stored on the deer stand 150 for usage as shown in FIGS. 5-7, where the ladder 180 is in a perpendicular relationship with the legs 170. Ladder 180 may further comprise a track that allows the longitudinal aspects of the ladder 180 to be secured safely, the track as shown in illustrations bisecting the base of the deer stand from the front of the vehicle to the back. As shown in the FIGS. 5-7, track may comprise a slotted rail into which the legs of the ladder 180 may be secured and stored. Other embodiments of the track not shown in illustrations may be utilized as well. As utilized and deployed, the ladder may be manipulated to fold down from a user in the bed of the vehicle. The user may then raise the deer stand from the flattened state seen in FIG. 7, so that the stand pivots up to an upright position While the present invention has been described in conjunction with the specific embodiments set forth above, many alternatives, modifications and other variations thereof will be apparent to those of ordinary skill in the art. All such alternatives, modifications and variations are intended to fall within the spirit and scope of the present invention.

The invention claimed is:

1. A rack for a utility vehicle having a cab, the rack being affixed to the vehicle and comprising:
   a rack base being affixed to the vehicle, and being in a parallel relationship to a bed of the vehicle, the rack base extending between a rear portion and a front portion of the rack and having a perimeter about the rack base, the rear portion of the rack positioned towards the rear end of the vehicle and the front portion of the rack positioned towards and over the cab of the vehicle;
   a longitudinal element bisecting the rack base, the longitudinal element extending between the rear portion of the rack and the front portion of the rack;
   a first unifying element at the rack base having a union configured at the front portion of the rack, the first unifying element positioned towards the front portion of the rack, whereby the longitudinal element bisects the first unifying element at the union, whereas the first unifying element is disposed within the perimeter of the rack base;
   the first unifying element further comprising a first leg and a second leg configured about the rack base, the first leg and second leg each having a first unifying end, the first unifying ends of the first leg and second leg converging at the union; and
   the first unifying element further comprising a third leg configured about the rack base, the third leg connecting the first and second legs at an end opposite of each of the first unifying ends of the first and second legs, whereby the longitudinal element bisects the third leg of the unifying element.

2. The rack in claim 1 further comprising an upper portion positioned above the rack base, the upper portion having a first supporting member.

3. The rack in claim 2, the first supporting member of the upper portion positioned extending above the union of the rack base.

4. The rack in claim 1, the rack base further comprising a second unifying element having a second union positioned at the rear portion of the rack, the second unifying element positioned towards the rear portion of the rack, whereby the longitudinal element bisects the second unifying element at the second union.

5. The rack in claim 4, the second unifying element further comprising a first leg of the second unifying element and a second leg of the second unifying element, the first leg of the second unifying element and the second leg of the second unifying element configured about the rack base, the first leg of the second unifying element and the second leg of the second unifying element each having a rear unifying end, the rear unifying ends of the first leg of the second unifying element and the second leg of the second unifying element converging at the second union.

6. The rack in claim 5, the second unifying element further comprising a third leg of the second unifying element configured about the rack base, the third leg connecting the first leg of the second unifying element and the second leg of the second unifying element at ends of the first leg of the second unifying element and the second leg of the second unifying element opposite of the unifying end of the first and second legs of the second unifying element, whereby the longitudinal element bisects the third leg of the second unifying element.

7. The rack in claim 6, whereby the third leg of the first unifying element and the third leg of the second unifying element are congruent.

8. The rack in claim 2, the upper portion having a second supporting member.

9. The rack in claim 4 being connected to the vehicle in at least one of the following areas of the vehicle: a bed, a roll-bar, a chassis, a cab.

10. The rack in claim 1 comprising at least one vertical support member extending between the rack base and a bed of the vehicle, the at least one vertical member having mating portions being telescopically adjustable in height, whereby a user of the rack may affix the height of the at least one vertical member along mating portions of the at least one vertical member.

11. The rack in claim 1, further comprising a bottom surface proximal to the vehicle bed, the bottom surface having a first side and a second side, the first side and second side being capable of extending and retracting in a direction parallel with the longitudinal element, the first and second sides further comprising a telescopic extension being secured by at least one affixing element.

12. The rack in claim 1, the perimeter at the rear portion of the rack having a gate about an upper portion of the rack.

13. The rack in claim 1, whereby the unifying element resembles an arrow pointing towards the front of the vehicle.

14. The rack in claim 1 further comprising an upper portion positioned to communicate with the perimeter of the rack base, and further comprising a vertical support member extending between the rack base and the upper portion.

15. The rack in claim 14 further comprising a slide member disposed between the vertical support member and the sides of the rack base, whereby the sliding member may travel along the rack base while a bottom surface extends or retracts at a mating portion of the bottom surface proximal to a bed of the vehicle.

16. The rack in claim 15, the sliding member configured to mate to the rack at a selected position of the mating portion of a bottom surface.

17. The rack in claim 1 further comprising at least one vertical support extending between the rack base and a bottom surface, the at least one vertical support being telescopically adjustable in height, whereby a user of the rack may raise or lower it by engaging mating portion along the at least one vertical support.

18. The rack in claim 1 further comprising a gate at a rear portion of an upper portion of the rack, the gate configured to be removed or extended in a direction along the sides of the upper portion of the rack.

19. The rack in claim 1 being connected to the vehicle in at least one of the following areas of the vehicle: a bed, a roll-bar, a chassis, a cab.

20. The rack in claim 4 being connected to the vehicle in at least one of the following areas of the vehicle: a bed, a roll-bar, a chassis, a cab.

\* \* \* \* \*